United States Patent [19]
Gordon et al.

[11] 3,957,726
[45] May 18, 1976

[54] S-TRIAZINE-IMIDE COPOLYMERS

[75] Inventors: David A. Gordon, Scarsdale; Raymond Seltzer, New City, both of N.Y.

[73] Assignee: Ciba-Geigy Corporation, Ardsley, N.Y.

[22] Filed: July 17, 1974

[21] Appl. No.: 489,227

[52] U.S. Cl............ 260/47 CP; 260/30.2; 260/30.4 N; 260/30.6 R; 260/30.8 R; 260/30.8 DS; 260/32.2; 260/32.4; 260/32.6 N; 260/33.8 R; 260/78 TF; 260/37 N; 260/46.5 E; 260/248 R; 260/49; 260/63 N; 260/248 NS; 260/65; 260/248 CS; 260/249.5; 260/249.8; 260/326 R; 260/326 S; 260/326 N; 260/326 A; 428/435; 428/458; 428/474; 428/475; 428/479
[51] Int. Cl.² ............... C08G 73/08; C08G 73/10
[58] Field of Search............ 260/47 CP, 65, 78 TF, 260/62 N, 49, 248 R, 248 NS, 248 CS, 249.5, 249.8, 326 R, 326 S, 326 N, 326 A, 30.2, 30.4 N, 30.6 R, 32.6 N, 30.8 R, 30.8 DS, 32.2, 32.4

[56] References Cited
UNITED STATES PATENTS

| | | | |
|---|---|---|---|
| 3,666,723 | 5/1972 | Kray et al. ............... | 260/65 |
| 3,803,075 | 4/1974 | Kray et al. ............... | 260/30.2 |

*Primary Examiner*—Lester L. Lee
*Attorney, Agent, or Firm*—Charles W. Vanecek

[57] ABSTRACT

Polyimides having a recurring unit

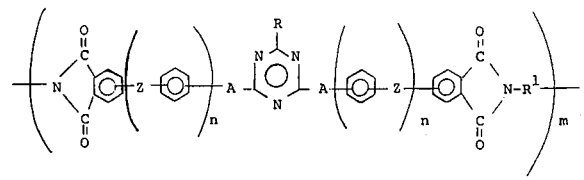

wherein R is an organic blocking group; A is NH, O or S; Z is the direct bond, O, S, SO$_2$,

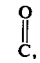

or CH$_2$; $n$ is 0 or 1; and R$^1$ is a divalent organic radical are prepared by reacting a diamine with a s-triazine dianhydride. These polyimides can be fabricated into films, coatings, laminates and the like. The polyimides are also fusible and moldings thus obtained are low in void content.

12 Claims, No Drawings

S-TRIAZINE-IMIDE COPOLYMERS

This invention relates to novel polyimides which are characterized by a recurring unit having the following structural formula

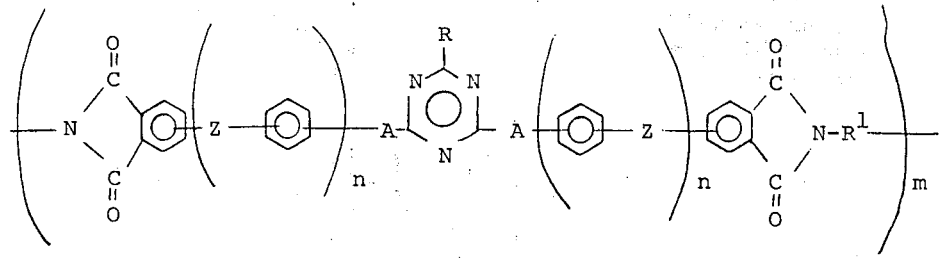

wherein

R is hydrogen, alkyl, cycloalkyl, aryl, substituted aryl, aralkyl, amino, diarylamino, di(lower)alkylamino, alkylamino, anilino, N-(lower)alkylanilino, aryloxy, alkoxy, thioalkoxy, thiophenoxy, mercapto, nitrogen heterocyclic, halo, hydroxyl, or carboxyl;

A is NH, O or S, preferably NH;

Z is the direct bond, O, S, $SO_2$,

or $CH_2$, preferably O and

$n$ is 0 or 1, preferably 0;

$R^1$ is a divalent organic radical selected from aromatic, aliphatic, alkyl aromatic, cycloaliphatic, and heterocyclic radicals, combinations of these, and radicals with heteroatom containing bridging groups where the heteroatom in the bridge is oxygen, sulfur, nitrogen, silicon or phosphorus; and $m$ is an integer of 2 or more and preferably between 4 and 100.

More specifically, the blocking group R is selected from the following groups:

a. hydrogen, amino, anilino, halo, especially chloro, hydroxyl, mercapto, and carboxyl, b. alkyl which is a straight or branched chain group of up to 8 carbon atoms, e.g., methyl, ethyl, n-propyl, isopropyl, n-butyl, tert-butyl, n-hexyl, and n-octyl, c. cycloalkyl of 3 to 6 carbon atoms, i.e., cyclopropyl, cyclobutyl, cyclopentyl, and cyclohexyl, d. aryl, such as phenyl, naphthyl, biphenyl, and anthracyl, especially phenyl, e. aryl substituted with groups such as nitro, halo, especially chloro and bromo, carboxyl, cyano, lower alkyl, hydroxy, aryl, or lower alkoxy of up to 4 carbon atoms. Illustrative examples of aryl substituted groups are carboxyphenyl, chlorophenyl, dichlorophenyl, bromophenyl, chloronaphthyl, methoxyphenyl, ethoxyphenyl, butoxyphenyl, tolyl, xylyl, ethylphenyl, diethylphenyl, butylphenyl and ethylnaphthyl. By the "lower alkyl" mentioned above is meant straight or branched chain alkyl groups having up to 4 carbon atoms, such as methyl, ethyl, n-propyl, isopropyl, n-butyl, sec-butyl, or t-butyl.

f. aralkyl, such as benzyl, 1-phenyl-hexyl and 1-phenylethyl, g. di(lower)alkyl amino, such as dimethylamino, diethylamino, di-n-propylamino, diisopropylamino and di-n-butylamino, h. N-(lower)alkylanilino, such as N-methyl anilino, N-ethyl anilino, and N-butyl anilino, i. diarylamino such as dinaphthylmino and N-aryl anilino, e.g., diphenylamino and N-naphthyl anilino, especially diphenylamino, and j. alkylamino such as methylamino, n-propylamino and n-octylamino k. alkoxy of up to 8 carbon atoms, thioalkoxy of up to 8 carbon atoms, thiophenoxy and aryloxy, especially phenoxy, and l. nitrogen heterocyclic, which contains nitrogen in the ring, such as morpholino, pyrrolidino, piperidino, a group having the structure

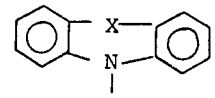

where X is a covalent bond (9-carbazolyl group), oxygen (10-phenoxazinyl group) and sulfur (10-phenothiazinyl group), a 1-indolyl group having the structure

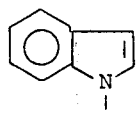

a 2-isoindolyl group having the structure

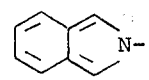

a 1-imidazolyl group having the structure

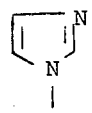

, and a 1-pyrroloyl group having the structure

The group R¹ as defined above, may be selected from alkylene groups containing from 2 to 12 carbon atoms; cycloalkylene groups containing from 4 to 6 carbon atoms; a xylylene group, arylene groups selected from ortho, meta or para phenylene, xylene, tolylene, biphenylene, naphthylene or anthrylene; a substituted arylene group of the formula

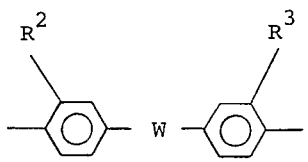

II wherein W is a covalent bond, sulfur, carbonyl, —NH, —N-(lower)alkyl, O, S, SS, —N-phenyl, sulfonyl, a linear or branched alkylene group of from 1 to 3 carbon atoms; arylene, especially phenylene group; or a dialkyl or diaryl silyl group; $R^2$ and $R^3$ are independent and each is hydrogen; halogen, especially chloro or bromo; lower alkyl from 1 to 5 carbon atoms, especially methyl; lower alkoxy containing from 1 to 5 carbon atoms, especially methoxy; or aryl, especially phenyl; or a group having the formula

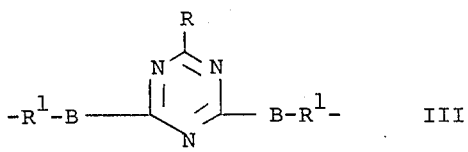

III wherein B is NH, O, S or the direct bond, preferably NH or the direct bond, and R and R¹ are as defined above.

More preferably, R¹ embraces groups which are derived from the aromatic diamines disclosed in the immediately preceding paragraph. Most preferably, R¹ is a group having the formula

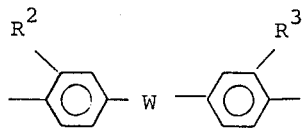

wherein W is a covalent bond, methylene, sulfur, oxygen, or sulfone, and $R^2$ and $R^3$ are independently hydrogen, halogen, or lower alkyl of from 1 to 5 carbon atoms, expecially methyl, or a group having the formula

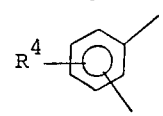

wherein $R^4$ is hydrogen, halogen or lower alkyl of from 1 to 5 carbon atoms, especially methyl.

A preferred embodiment of the s-triazinyl groups of formula III above is the group having the formula

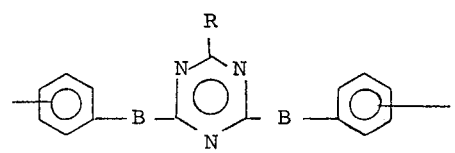

where B is a direct bond or —NH— and R is phenyl or diphenylamino.

The polyimides of this invention are prepared by a process comprising reacting s-triazine dianhydrides with diamines in an orgaic reaction medium which is a solvent for at least one of the reactants, preferably under substantially anhydrous conditions, at a temperature below 100°C.

The s-triazine dianhydrides employed in preparing the instant polyimides can be represented by the following structure:

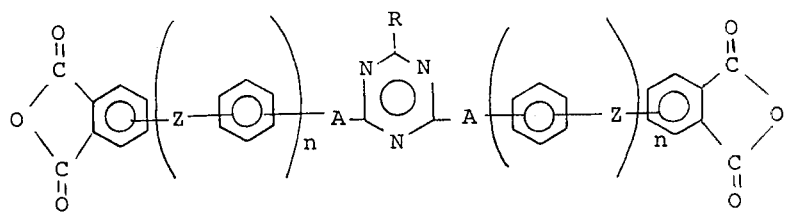

wherein R, A, Z and n are as defined above.

These dianhydrides are prepared by reacting a dihalo triazine with a dicarboxylic acid of the formula

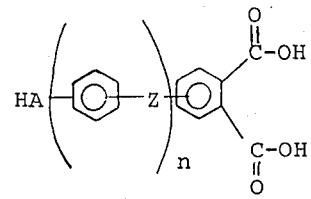

wherein A, Z and n are as defined above. The tetracarboxylic acid can then be dehydrated to yield the corresponding dianhydride. The tetraacid is dehydrated by conventional methods such as, for example, refluxing in nitrobenzene, refluxing in acetic anhydride or heating the acid in the solid state and removing water by vacuum. The preparation of the dianhydrides is described in greater detail in the copending application filed on the same day as the instant application (Docket Number GC Ser. No. 489,225 697,). The teachings of this copending application are incorporated herein by reference.

Illustrative examples of the diamines useful in this invention are the following:

4,4'-methylenebis(o-chloroaniline)
3,3'-dichlorobenzidine 3,3'-sulfonyldianiline
4,4'-diaminobenzophenone
1,5-diaminonaphthalene
bis(4-aminophenyl)diethyl silane
bis(4-aminophenyl)diphenyl silane
bis(4-aminophenyl)ethyl phosphine oxide
N-{bis(4-aminophenyl)}N-methyl amine
N-{bis(4-aminophenyl)}N-phenyl amine
4,4'-methylenebis(2-methylaniline)
4,4'-methylenebis(2-methoxyaniline)
5,5'-methylenebis(2-aminophenol)
4,4'-methylenebis(2-methylaniline)
4,4'-oxybis(2-methoxyaniline)
4,4'-oxybis(2-chloroaniline)
5,5'-oxybis(2-aminophenol)
4,4'-thiobis(2-methylaniline)
4,4'-thiobis(2-methoxyaniline)
4,4'-thiobis(2-chloroaniline)
4,4'-sulfonylbis(2-methylaniline)
4,4'-sulfonylbis(2-ethoxyaniline)
4,4'-sulfonylbis(2-chloroaniline)
3,3'-dimethyl-4,4'-diaminobenzophenone
5,5'-sulfonylbis(2-aminophenol)
3,3'-dimethoxy-4,4'-diaminobenzophenone
3,3'-dichloro-4,4'-diaminobenzophenone
4,4'-diaminobiphenyl
m-phenylenediamine
p-phenylenediamine
4,4'-methylenedianiline
4,4'-oxydianiline
4,4'-thiodianiline
4,4'-sulfonyldianiline
4,4'-isopropylidenedianiline
3,3'-dimethylbenzidine
3,3'-dimethoxybenzidine
3,3'-dicarboxybenzidine
2,4'-diaminotoluene
2-phenyl-4,6-bis{4'-(p-aminophenthioxy)phenyl}-s-triazine
2-diphenylamino-4,6-bis(m-aminoanilino)-s-triazone
2-dimethylamino-4,6-bis(p,p'-aminothiophenoxyphenyl)-s-triazine
2-amino-4,6-bis(p,p'-aminothiophenoxyphenyl)-s-triazine
4,6-bis(m-aminoanilino)-s-triazine
2-piperidino-4,6-bis(p,p'-aminothiophenoxy-phenyl)-s-triazine
2-anilino-4,6-bis(p,p'-aminothiophenoxyphenyl)-s-triazine
2-phenyl-4,6-bis(p,p'-aminothiophenoxyphenyl)-s-triazine
2-phenyl-4,6-bis(p-aminophenyl)-s-triazine
2-phenyl-4,6-bis(m-aminophenyl)-s-triazine
2-diphenylamino-4,6-bis(m and p-aminophenyl)-s-triazine
2-phenyl-bis[4'-(4-aminophenoxy)phenyl]-s-triazine
2-phenyl-4,6-bis(p-aminobenzyl)-s-triazine
2-phenyl-4,6-bis(4'-aminoanilino)-s-triazine 2-phenyl-4,6-bis(3'-aminoanilino)-s-triazine
2-anilino-4,6-bis(4'-aminoanilino)-s-triazine
2-(N-methylanilino)-4,6-bis(3'-aminoanilino)-s-triazine
2-dimethylamino-4,6-bis(3'-aminoanilino)-s-triazine
2-dibutylamino-4,6-bis(3'-aminopropylamino)-s-triazine
2-diphenylamino-4,6-bis(2'-aminoanilino)-s-triazine
2-diphenylamino-4,6-bis(4'-aminoanilino)-s-triazine
2-methyl-4,6-bis(8'-aminooctylamino)-s-triazine
2-n-octyl-4,6-bis(4'-aminobutylamino)-s-triazine
2-isopropyl-4,6-bis(4'-aminobutylamino)-s-triazine
2-phenyl-4,6-bis(2'-methyl-4'-aminoanilino)-s-triazine
2-diphenylamino-4,6bis(3'aminocyclohexylamino)-s-triazine
2-phenyl-4,6-bis(aminocyclopropylamino)-s-triazine
2-phenyl-4,6-bis(3'-aminopyridinylamino-5')-s-triazine
2-piperidino-4,6-bis(3'-aminoanilino)-s-triazine
2,4-bis(3'-aminoanilino)-s-triazine
2-cyclohexyl-4,6-bis(3'-aminoanilino)-s-triazine
2-amino-4,6-bis(3'-aminoanilino)-s-triazine
2-diphenylamino-4,6-bis[4-(p-aminophenoxy)anilino]-s-triazine The product of the reaction between the dianhydride and the diamine is a polyamide acid which may be represented by the following general formula:

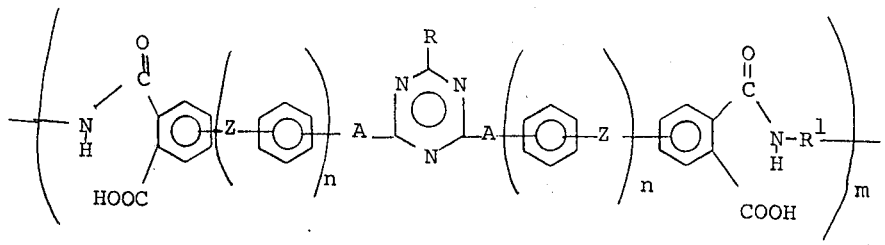

wherein R, A, Z, R¹, n and m are as defined above.

The above reaction can be carried out conveniently in a number of ways. The s-triazine dianhydride and the diamine can be premixed as dry solids in equimolar amounts and the resulting mixture can be added, in small portions and with agitation, to the organic solvent. This method is particularly effective in reactions which are relatively exothermic. However, it is also possible to add slowly with agitation the solvent to the premixed reactants. Another variation is to dissolve the diamine in the solvent and then add thereto the s-triazine dianhydride at a rate that provides a controllable rate of reaction. It is also possible to add the reactants separately and in small portions to the solvent or to dissolve the reactants in separate portions of the solvent and then slowly adding the two solutions to the reaction vessel.

The degree of polymerization of the polyamide acid is subject to a deliberate control. The use of equal molar amounts of the reactants under the prescribed conditions provides polyamide acids of very high molecular weight. The use of either reactant in large excess limits the extent of polymerization. However, the scope of the process encompasses the use of up to 5% excess of either the diamine or the dianhydride. More than 5% excess of either reactant results in an undesirably low molecular weight polyamide acid. For some purposes, it is desirable to use 1–3% excess of either reactant, preferably the dianhydride. Besides using an excess of one reactant to limit the molecular weight of the polyamide acid, a chain terminating agent such as phthalic anhydride or aniline may be used to "cap" the ends of the polymer chains.

In the preparation of the polyamide acid intermediate, it is essential that the molecular weight be such that the inherent viscosity of the polyamide acid is at least 0.05, preferably 0.1 – 5.0. The inherent viscosity is measured at 30°C at a concentration of 0.5% by weight of the polymer in a suitable solvent, e.g., N,N-dimethylacetamide, N-methylpyrrolidone, dimethylformamide, etc. To calculate inherent viscosity the viscosity of the polymer solution is measured relative to that of the solvent alone.

$$\text{Inherent viscosity} = \frac{\text{natural logarithm} \times \frac{\text{Viscosity of solution}}{\text{Viscosity of solvent}}}{C}$$

wherein C is the concentration expressed in grams of polymer per 100 milliliters of solution. As known in the polymer art inherent viscosity is directly related to the molecular weight of the polymer.

The quantity of organic solvent used in the preferred process need only be sufficient to dissolve enough of one reactant, preferably the diamine, to initiate the reaction of the diamine and the dianhydride. The solvents useful in the solution polymerization process for synthesizing the intermediate polyamide acid compositions in the process of preparing the polyimides are organic solvents which are substantially inert toward the diamine and dianhydride reactants. The normally liquid organic solvents of the N,N-dialkylcarboxylamide class are useful as solvents in the process of this invention. The preferred solvents are the lower molecular weight members of this class, particularly N,N-dimethylformamide, N,N-dimethylacetamide and N-methyl-2-pyrrolidone. They may easily be removed from the polyamide acid and/or polyamide acid shaped articles by evaporation, displacement or diffusion. Other typical compounds of this useful class of solvents are:

N,N-diethylformamide
N,N-diethylacetamide
N-methylcaprolactam
dioxane
dimethylsulfoxide
tetramethylurea
pyridine
dimethylsulfone
hexamethylphosphoramide
tetramethylene sulfone
formamide
N-methylformamide
butyrolactone The solvents can be used alone, in combinations of solvents, or in combination with poor solvents such as benzene, benzonitrile, dioxane, xylene, toluene and cyclohexane.

To determine a specific time and a specific temperature for forming the polyamide acid of one of the specified diamines and a specified dianhydride, several factors must be considered. The maximum permissible temperature will depend on which particular diamine is used, the dianhydride used, the particular solvent, the percentage of polyamic acid desired in the final composition and the minimum period of time that one desired for the reaction. For most combinations of s-triazine dianhydrides and the diamines falling within the definitions given above, it is possible to form compositions of 100% polyamic acid by conducting the reaction below 100°C. However, temperatures up to the boiling point of the solvent or higher when pressure equipment is employed may be tolerated to provide shapable compositions. However, to obtain the maximum inherent viscosity, i.e., maximum degree of polymerization, for any particular combination of s-triazine dianhydride, diamine, solvent, etc., and thus produce shaped articles such as films and filaments of optimum toughness, it has been found that the temperature throughout the reaction should be maintained below 125°C.

The polymeric acid prepared as described above can be isolated by evaporating the solvent at temperatures lower than 70°C. The polyamic acid is soluble in organic solvents.

The polyamide acid may be converted to polyimide by a variety of methods. One method comprises converting the polyamic acid by heating it above 50°C. Heating serves to convert pairs of amide and carboxylic acid groups to imide groups. Heating may be conducted for a period of a few seconds to several hours. Imidization can be accomplished when the polyamide acid is either in solid form or in solution. It has been found that after the polyamide acid has been converted to the polyimide in accordance with the above described heat conversion, if the polyimide is further heated to a temperature of 300°–500°C for a short period, improvements in the thermal and hydrolytic stabilities of the polyimide are obtained.

A second method for converting the polyamide acid composition to the polyimide thereof is a chemical treatment and involves treating the polyamic acid composition with a dehydrating agent alone or in combination with a tertiary amine, e.g., acetic anhydride or an acetic anhydride-pyridine mixture. The polyamide acid shaped article can be treated in a bath containing the acetic anhydride-pyridine mixture. The ratio of acetic anhydride to pyridine may vary from just above zero to inifinite mixtures. It is believed that the pyridine functions as a catalyst for the action of the cyclizing agent, the acetic anhydride. Other possible dehydrating agents for use include propionic anhydride, butyric anhydride, valeric anhydride and mixed lower fatty-acid anhydrides. Other tertiary amine catalysts include triethylamine, isoquinoline, $\alpha$ or $\beta$ gamma-picoline, 2,5-lutidine, etc.

A third for conversion involves treatment, with a carbodiimide, e.g., dicylohexylcarbodiimide. The carbodiimide also serves to dehydrate the polyamic acid and to act as an effective cyclyzing agent.

As a fourth method of conversion, a combination treatment may be used. The polyamide acid may be partially converted to the polyimide in a chemical conversion treatment and then cyclization to the polyimide may be completed by subsequent heat treatment.

It should be understood that instead of shaping the polyamide acid composition into the usual articles, the polyamic acid composition in the solvent may be used as a liquid coating composition. Such coating compositions may be pigmented with such compounds as titanium dioxide in amounts of 5–200 % by weight. These coating compositions may be applied to a variety of substrates, for example, metals, e.g., copper, brass, aluminum, steel, etc., the metals in the form of sheets, fibers, wires, screening, etc.; glass in the form of sheets, fibers, foams, fabrics, etc.; polymeric materials, e.g., cellulosic materials such as cellophane, wood, paper etc., polyolefins such as polyethylene, polypropylene, polystyrene, etc., perfluorocarbon polymers such as, polytetrafluorethylene, copolymers of tetrafluoroethylene with hexafluoropropylene, etc., polyurethanes, all polymeric materials in the form of sheets, fibers, foams, woven and non-woven fabrics, screening, etc; leather sheets; etc. The polyamic acid coatings are then converted to polyimide coatings by one or more of the processes to be described.

The polyimides of this invention find many applications in a wide variety of physical shapes and forms. Among the most significant of these forms are films, fibers adhesives, laminating resins, especially for printed circuit boards, coatings, especially for decorative and electrical purposes, wire enamels and molding compounds. The useful combination of the desirable physical and chemical characteristics of this polymer is unique. These polyimides not only possess excellent physical properties at room temperature, but retain their strength and excellent response to work-loading at elevated temperatures for prolonged periods of time. Behavior of this type offers commercial utility in a wide range of end uses. These polyimide polymers display excellent resistance to strong acids and alkalies, to corrosive atmospheres, outstanding resistance to degradation by high energy particles and gamma ray radiation. The polymer resists melting upon exposure at 500°C. for extended periods while retaining hitherto unrealized high proportions of room temperature physical properties. Because of the unusual and surprising solubility of the polymer precursor it may be processed into shaped articles such as films and fibers by conventional techniques and then converted in situ to the polyimide polymer. Solutions of the s-triazine containing polyamide acids or polyimides can be used to impregnate reinforcing fibers and fabrics like glass, boron, metal oxide whiskers and graphite. These prepregs can then be cured to form rigid polyimide laminates or composites or to form strong thermally resistant structural adhesive bonds between aluminum, stainless steel, titanium or other metals.

Films formed from the polymer of this invention may be used wherever films have heretofore been used. They serve advantageously in an extensive variety of wrapping, packaging and bundling applications. Additionally, the polymer and film-forming polymer may be used in automobile and aviation interior head lining materials, decorative trim, high temperature electrical insulation such as for slot liners, in dry transformers, capacitors, cable wrappings, etc., packaging of items to be exposed to high temperature or high energy radiation while within the package, corrosion-resistant pipe, duct work, containers and container linings, and laminating structures where the films are bonded to the sheet metal or foils, and a variety of other similar and related uses. In fiber form, the polymer offers possibilities for high temperature electrical insulation, protective clothing and curtains, filtration media, packing and gusseting materials, brake linings and clutch facings.

The polyimides produced according to this invention are in many cases characterized by useful solubility in certain organic solvents. Polyimides heretofore known to the art have generally been extremely insoluble, and have not been shapeable after conversion from the polyamide-acid state to the polyimide form. Many of the polyimides of the invention are extremely useful in that they can be dissolved in certain solvents, in relatively high concentration, and the solutions can be employed for further fabrication of the polyimides. Instead of an unstable polyamic acid solution there is obtained a stable solution of the polyimide. In this way, it is possible to produce polyimide films, coatings, laminates and the like without the necessity of using a polyamide-acid intermediate with a followup conversion step. This is highly advantageous, because it permits the application of polyimide coatings to articles which might be damaged by heating or chemical conversion techniques heretofore necessary. Furthermore, in the processing of the polyimide no volatile by-products are evolved during the curing reaction. As a result, there is a minimization in the void content of the final product and a concomitant enhancement in mechanical properties.

Examples of organic solvents in which good solubility has been obtained are the following:

N,N-dimethylformamide
N,N-dimethylacetamide
N-methyl-2-pyrrolidone
dimethylsulfoxide
tetrahydrofuran
diglyme
tetrachlorethane
nitrobenzene.

The soluble polyimides can be precipitated from their solutions by use of methanol, water, acetone, spray drying and the like. The resulting granular material can be molded or redissolved in a suitable solvent to yield a film-forming or varnish type composition. Other appropriate ingredients can be added to the polyimide solutions or molding powders including fillers, dyes, pigments, thermal stabilizers and reinforcing agents, such as glass fiber, carbon, boron and the like, depending on the end use.

The polyimides are further characterized by high glass transition temperatures, Tg. This makes it possible for the polyimides to be used at higher temperatures than many prior art polyimides. Since at temperatures above the transition temperature the polymers lose their stiffness and mechanical properties, any increase in transition temperature is of great importance.

To further illustrate the nature of this invention and the process employed in preparing the polyimides, the following examples are given below.

EXAMPLE 1

Preparation of Polyimide from 4,4'-oxydianiline (ODA) and 2-diphenylamino-4,6-bis2',3'-(dicarboxyanilino)-s-triazine dianhydride (2,3 DATDA)

To a solution of 1.001 g (0.0050 mole) of ODA in 10 g of NMP at 50° was added 2.938 g (0.0052 mole) of 2,3-DATDA in four portions over a 1 hour 45 minute period. Continued stirring at 50° for 2 hours gave the polyamic acid (Inherent Viscosity = 0.21). Heating a sample of the polyamic acid solution at 200° for 1 hour precipitated the polyimide powder. Another sample of the polyamic acid solution was cast on an aluminum sheet. Curing over a one hour period with the temperature being gradually raised from room temperature to 300° followed by one hour at 300° gave a polyimide film.

EXAMPLE 2

Preparation of Polyimide from 2-diphenylamino-4,6-bis(meta-aminoanilino)-s-triazine (DPAAT) and 2-diphenylamino-4,6-bis-(2',3'-dicarboxyanilino)-s-triazine dianhydride (2,3 DATDA)

To a solution of 1.643 g (0.0031 mole) of DPAAT (dioxane complex) in 10 g of NMP at 50° was added 1.763 g (0.0031 mole) of 2,3-DATDA in 4 portions over a 90 minute period. Continued reaction at 50° for 2.5 hours gave the polyamic acid (Inherent Viscosity 0.12). A sample of the polyamic acid solution was heated at 200° for 1 hour. On cooling the resulting polyimide stayed in solution. It was isolated by precipitation with acetone, filtration and drying. A polyimide film was obtained by curing the polyamic acid as described in Example 1.

EXAMPLE 3

Preparation of Polyimide from 4,4'-methylenedianiline (MDA) and 2-diphenylamino-4,6-bis(2', 3'-dicarboxyanilino)-s-triazine dianhydride (2,3 DATDA)

MDA and 2,3-DATDA were polymerized essentially as described in Examples 1 and 2 to give the polyamic acid. Heating gave the polyimide.

EXAMPLE 4

Preparation of Polyimide from 4,4'-oxydianiline (ODA) and 2-diphenylamino-4,6-bis(3', 4'-dicarboxyanilino)-s-triazine dianhydride (3,4-DATDA)

To a solution of 1.001 g (0.005 mole) of ODA in 20 g of NMP was added 2.853 g (0.005 mole) of 3,4-DATDA in four portions over a 40 minute period. Continued reaction at room temperature for 24 hours gave the polyamic acid (Inherent Viscosity = 0.26). A sample of the polyamic acid solution was imidized by heating at 200° for one hour. A polyimide film on aluminum was prepared as described in Example 1.

EXAMPLE 5

Preparation of Polyimide from 4,4'-methylene-dianiline (MDA) and 2-diphenylamino-4,6-bis-(3', 4'-dicarboxyanilino)-s-triazine dianhydride (3,4-DATDA)

To a solution of 0.986 g (0.005 mole) of MDA in 15 g of NMP was added 2.938 g (0.0051 mole) of 3,4-DATDA in three portions over a 40 minute period. Continued stirring at room temperature for 24 hours gave the polyamic acid (Inherent Viscosity = 0.24). Heating the polyamic acid solution at 200° for 1 hour gave the polyimide. A polyimide film was obtained as described in Example 1.

EXAMPLE 6

Preparation of Polyimide from 2-diphenylamino-4,6-bis(meta-aminoanilino)-s-triazine (DPAAT) and 2-diphenylamino-4,6-bis-(3', 4'-dicarboxyanilino)-s-triazine dianhydride (3,4-DATDA)

Equimolar quantities of 3,4-DATDA and DPAAT were polymerized to give the polyamic acid as described in Example 4 (Inherent Viscosity = 0.19). Imidizing the polyamic acid essentially as in Example 1 gave a soluble polyimide. The polyimide powder was isolated by precipitation with acetone, filtration and drying. A polyimide film was obtained as described in Example 1.

EXAMPLE 7

Preparation of Polyimide from 4,4'-methylene-dianiline (MDA) and 2-phenyl-4,6-bis-(2', 3'-dicarboxyanilino)-s-triazine dianhydride (2,3-PATDA)

To a solution of 0.198 g (0.001 mole) of MDA in 5 g of NMP was added 0.489 g (0.001 mole) of 2,3-PATDA in two portions over a 10 minute period to give the polyamic acid (Inherent Viscosity = 0.25). Heating the polyamic acid solution at 200° for 1 hour precipitated the polyimide powder. A polyimide film on aluminum was obtained as described in Example 1.

EXAMPLE 8

Preparation of Polyimide from 4,4'-oxydianiline (ODA) and 2-phenyl-4,6-bis-(2', 3'-dicarboxyanilino)-s-triazine dianhydride (2,3-PATDA)

The polyamic acid was obtained from ODA and 2,3-PATDA essentially as described in Example 7 using a 2% excess of 2,3-PATDA (Inherent Viscosity = 0.25). Heating the polyamic acid solution at 200° precipitated the polyimide powder. A polyimide film was obtained as described in Example 1.

EXAMPLE 9

Preparation of Polyimide from 2-diphenylamino-4,6-bis(meta-aminoanilino)-s-triazine (DPAAT) and 2-phenyl-4,6-bis(2', 3'-dicarboxyanilino)-s-triazine dianhydride (2,3-PATDA)

The polyamic acid was obtained from DPAAT and 2,3-PATDA essentially as described in Example 8. (Inherent Viscosity = 0.23). After imidization as in Example 1, the polyimide remained in solution. It was isolated by precipitation with water, filtration and drying. A polyimide film was obtained as in Example 1.

EXAMPLE 10

Preparation of Polyimide from methylene-bis-(o-chloroaniline) (MOCA) and 2-phenyl-4,6-bis-(2', 3'-dicarboxyanilino)-s-triazine dianhydride (2,3-PATDA)

To a solution of 0.267 g of MOCA in 6 g of NMP was added 0.489 g of 2,3-PATDA in two portions over a 15 minute period. Stirring overnight at room temperature gave the polyamic acid solution (Inherent Viscosity = 0.14). Heating the polyamic acid solution at 200° for 1 hour gave a polyimide solution. The polyimide was isolated by precipitation with water, filtration and drying. A polyimide film was obtained as described in Example 1.

EXAMPLE 11

Preparation of Polyimide from 4,4'-oxydianiline (ODA) and 2-phenyl-4,6-bis-(3', 4'-dicarboxyanilino)-s-triazine dianhydride (3,4-PATDA)

To a solution of 0.204 g (0.001 mole) of ODA in 3.4 g of NMP was added 0.491 g (0.001 mole) of 3,4-PATDA in three portions over a 20 minute period. Continued reaction at room temperature for 24 hours gave the polyamic acid (Inherent Viscosity = 0.18). Heating the polyamic acid solution at 200° for 1 hour gave a polyimide solution. The polyimide was isolated by precipitation with acetone, filtration and drying. A polyimide film was obtained as described in Example 1.

EXAMPLE 12

Preparation of Polyimide from 4,4'-methylene-dianiline (MDA) and 2-phenyl-4,6-bis-(3', 4'-dicarboxyanilino)-s-triazine dianhydride (3,4-PATDA)

Following the procedure for Example 11, the 3,4-PATDA-MDA polyamic acid was obtained (Inherent Viscosity = 0.18). Imidization to the soluble polyimide, isolation and preparation of a polyimide film were carried out essentially as in Example 11.

EXAMPLE 13

Preparation of Polyimide from 2-diphenylamino-4,6-bis-(m-aminoanilino)-s-triazine (DPAAT) and 2-phenyl-4,6-bis-(3', 4'-dicarboxyanilino)-s-triazine dianhydride (3,4-PATDA)

The polyamic acid (Inherent Viscosity = 0.13) and polyimide were obtained as described in Example 11. A polyimide film was obtained as described in Example 1.

EXAMPLE 14

Preparation of Polyimide from methylene-bis-(o-chloroaniline) (MOCA) and 2-phenyl-4,6-bis-(3', 4'-dicarboxyanilino)-s-triazine dianhydride (3,4-PATDA)

To 0.268 g (0.001 mole) of MOCA in 3.4 g of NMP was added 0.491 g (0.001 mole) of 3,4-PATDA in three portions over a 15 minute period. After being maintained for 30 minutes at room temperature, the mixture was heated to 75° to effect solution, followed by 24 hours at room temperature to obtain the polyamic acid (Inherent Viscosity = 0.16). The polyimide was obtained as in Example 11 and a polyimide film on aluminum was obtained as in Example 1.

EXAMPLE 15

Preparation of Polyimide from 4,4'-oxydianiline (ODA) and 2-diphenylamino-4,6-bis-(3', 4'-dicarboxyphenoxy)-s-triazine dianhydride Equimolar quantities of 2-diphenylamino-4,6-bis-(3', 4'-dicarboxyphenoxy)-s-triazine dianhydride and ODA are polymerized in NMP as described in Example 4 to give the polyamic acid. Heating the polyamic acid in NMP at 200° for 1 hour gives the polyimide. A polyimide film is obtained by following the procedure of Example 1.

EXAMPLE 16

Preparation of Polyimide from 4,4'-methylene dianiline (MDA) and 2-phenyl-4,6-bis-(3', 4'-dicarboxythiophenoxy)-s-triazine dianhydride Equimolar quantities of the above dianhydride and MDA are polymerized as described in Example 5 to give the polyamic acid. Heating the polyamic acid in NMP at 200° for 1 hour yields the polyimide. A polyimide film is obtained by following the procedure of Example 1.

Example 17

Preparation of Polyimide from 4,4'-oxydianiline (ODA) and 2-diphenylamino-4,6-bis-{4'-(3'', 4''-dicarboxyphenoxy)-anilino}-s-triazine dianhydride Equimolar quantities of the above dianhydride and ODA are polymerized in NMP as described in Example 4 to give the polyamic acid. The polyamic acid solution is heated at 200° for 1 hour to give the polyimide. A polyimide film is obtained by following the procedure of Example 1.

EXAMPLE 18

Preparation of Polyimide from 4,4'-methylene dianiline (MDA) and 2-diphenylamino-4,6-bis- 4'-(3'', 4''-dicarboxybenzoyl)anilino -s-triazine dianhydride Equimolar quantities of the above dianhydride and MDA are polymerized in NMP as described in Example 5 to give the polyamic acid. Heating the polyamic acid solution at 200° for 1 hour yields the polyimide. A polyimide film is obtained by following the procedure described in Example 1.

EXAMPLE 19

Tg and TGA Breakpoint Values of Polyimide Resins

| Polyimide | of Example | Tg[1](°C) | TGA[2](°C) |
|---|---|---|---|
| 2,3-DATDA - ODA | 1 | 355 | 475 |
| 2,3-DATDA - DPAAT | 2 | 317 | 450 |
| 2,3-DATDA - MDA | 3 | 355 | — |
| 3,4-DATDA - ODA | 4 | 308 | 425 |
| 3,4-DATDA - MDA | 5 | 313 | 425 |
| 3,4-DATDA - DPAAT | 6 | 310 | 375 |
| 2,3-PATDA - MDA | 7 | 342 | 400 |
| 2,3-PATDA - ODA | 8 | 335 | 400 |
| 2,3-PATDA - DPAAT | 9 | 318 | 400 |
| 2,3-PATDA - MOCA | 10 | 330 | 450 |
| 3,4-PATDA - ODA | 11 | 325 | 400 |
| 3,4-PATDA - MDA | 12 | 325 | 375 |
| 3,4-PATDA - DPAAT | 13 | 312 | 375 |
| 3,4-PATDA - MOCA | 14 | 340 | 400 |

[1]Torsional Braid Analysis (TBA)
[2]By Thermogravimetric Analysis (TGA). At the indicated breakpoint the sample has lost 2% of its initial weight in air (heating rate = 20°/min.).

EXAMPLE 20

Solubilities of Polyimides

| Polyimide | of Example | Solvent[1] | |
|---|---|---|---|
| | | At Room Temperature | Above Room Temperature[2] |
| 2,3-DATDA - DPAAT | 2 | TCE and 18% in NMP | DMF, DMAc, NB |
| 3,4-DATDA - ODA | 4 | 14% in NMP[3] | — |

[1]Designations of solvents have the following meanings:
  NMP = N-methylpyrrolidone
  DMF = dimethylformamide
  DMAC = N,N-dimethylacetamide
  DMSO = dimethylsulfoxide
  THF = Tetrahydrofuran
  TCE = Tetrachloroethane
  NB = nitrobenzene
[2]Warming on a hot plate below the boiling point of the solvent.
[3]Comes out of solution after one day at room temperature.

| Polyimide | of Example | Solvent[1] | |
|---|---|---|---|
| | | At Room Temperature | Above Room Temperature[2] |
| 3,4-DATDA - MDA | 5 | 20% in NMP[3] | — |
| 3,4-DATDA - DPAAT | 6 | DMF, DMAc, DMSO, THF, diglyme and 21% in NMP | dioxane, TCE, NB |
| 2,3-PATDA - DPAAT | 9 | TCE and 13% in NMP | DMF, DMAc, NB |
| 2,3-PATDA - MOCA | 10 | NB and 10% in NMP | DMF, DMAc, TCE |
| 3,4-PATDA - ODA | 11 | DMAc and 14% in NMP | NB, DMF, DMSO |
| 3,4-PATDA - MDA | 12 | DMAc and 13% in NMP | NB, DMF, DMSO |
| 3,4-PATDA - DPAAT | 13 | DMF, DMAc, DMSO and 15% in NMP | — |
| 3,4-PATDA - MOCA | 14 | DMF, DMAc, DMSO and 16% in NMP | — |

[1]Designations of solvents have the following meanings:
   NMP = N-methylpyrrolidone   THF = Tetrahydrofuran
   DMF = dimethylformamide   TCE = Tetrachloroethane
   DMAC = N,N-dimethylacetamide   NB = nitrobenzene
   DMSO = dimethylsulfoxide
[2]Warming on a hot plate below the boiling point of the solvent.
[3]Comes out of solution after one day at room temperature.

What is claimed is:

1. A polyimide consisting essentially of the recurring unit having the structure

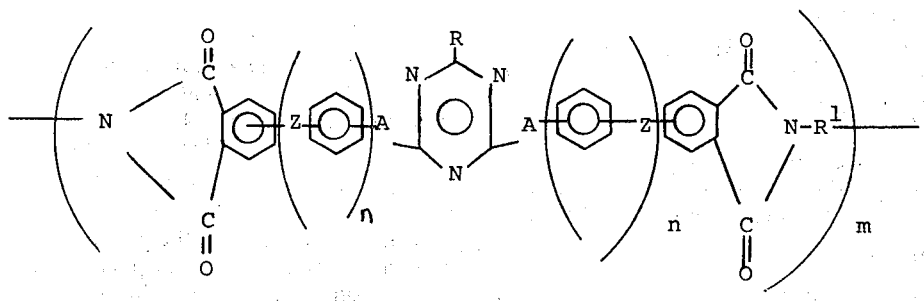

wherein

R is hydrogen, alkyl, cycloalkyl, aryl, aryl substituted with nitro, halo, carboxyl, cyano, lower alkyl, hydroxy, aryl, or lower alkoxy of up to 4 carbon atoms, aralkyl, amino, diarylamino, di(lower)alkylamino, alkylamino, anilino, N-(lower alkyl)anilino, aryloxy, alkoxy, thioalkoxy, thiophenoxy, mercapto, morpholino, pyrrolidino, piperidino, a group having the structure

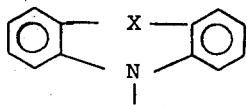

where X is a covalent bond (9-carbazolyl group), oxygen (10 phenoxazinyl group) and sulfur (10-phenothiazinyl group), a 1-indolyl group having the structure

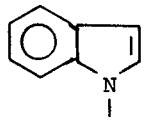

a 2-isoindolyl group having the structure

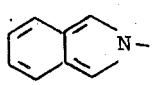

a 1-imidazolyl group having the structure

a 1-pyrroloyl group having the structure

halo, hydroxyl, or carboxyl,
A is NH, O or S;
Z is the direct bond, O, S, SO$_2$, C, or CH$_2$;
n is 0 or 1;
R$_1$ is a divalent organic radical selected from alkylene groups containing from 2 to 12 carbon atoms; cycloalkylene groups containing from 4 to 6 carbon atoms; a xylylene group, arylene groups selected from ortho, meta or para phenylene, xylene, tolylene, biphenylene, naphthylene, or anthrylene; a substituted arylene group of the formula $$\begin{array}{c} R^2 \\ \diagdown \end{array} \phantom{xx} \begin{array}{c} R^3 \\ \diagdown \end{array}$$
—⟨O⟩—W—⟨O⟩—    II wherein W is a covalent bond, sulfur, carbonyl, —NH, —N—(lower)alkyl, O, S, SS, —N-phenyl, sulfonyl, a linear or branched alkylene group of from 1 to 3 carbon atoms; arylene; or a dialkyl or diaryl silyl group; R$^2$ and R$^3$ are independent and each is hydrogen; halogen; lower alkyl from 1 to 5 carbon atoms; lower alkoxy containing from 1 to 5 carbon atoms; or aryl; or a group having the formula

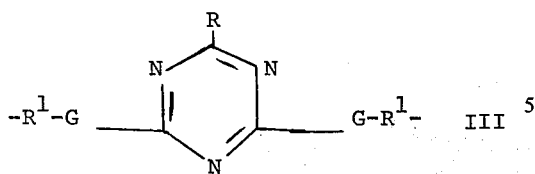

wherein G is NH, O, S or the direct bond, and R and R¹ are as defined above; and m is an integer of 2 or more.

2. A polyimide of claim 1 wherein R¹ is equal to (a) 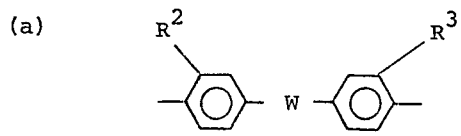

wherein W is a covalent bond, methylene, sulfur, oxygen, —S-S—, or sulfone, and $R^2$ and $R^3$ are independently hydrogen, halogen or lower alkyl of from 1 to 5 carbon atoms, (b) 

wherein $R^4$ is hydrogen, halogen or lower alkyl of from 1 to 5 carbon atoms, or (c) 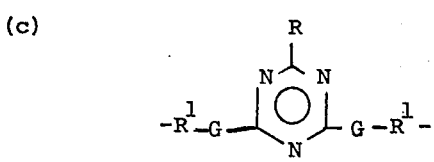

wherein G is NH, O, S or the direct bond, and R and R¹ are as defined in claim 1.

3. A polyimide of claim 2 wherein R is equal to phenyl or diphenylamino.

4. A polyimide of claim 2 wherein R¹ is ortho, meta or para phenylene.

5. A polyimide of claim 2 wherein
a. R is equal to phenyl or diphenylamino,
b. R¹ is equal to

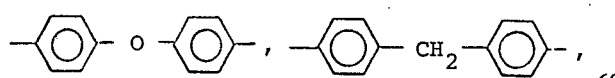

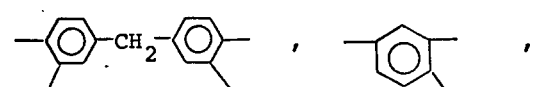

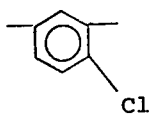

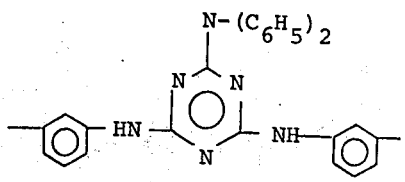

c. A is equal to NH, and
d. n is equal to 0.

6. A solution consisting essentially of a polyimide having the recurring unit

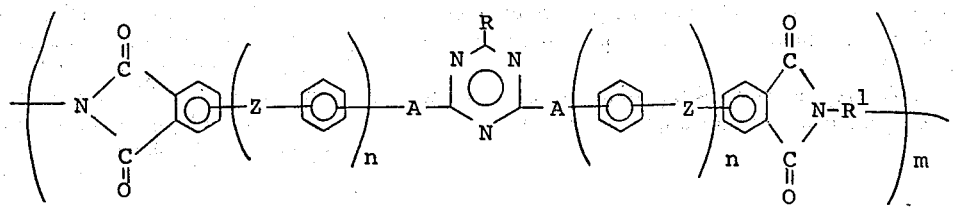

wherein
a. R is equal to diphenylamino phenyl,
b. R¹ is equal to

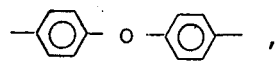

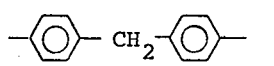

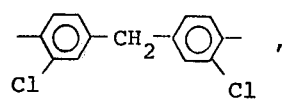

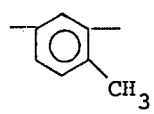

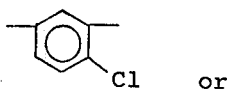    or

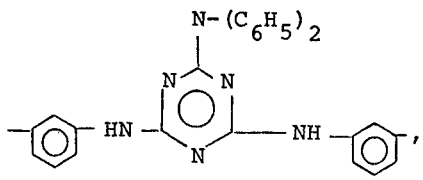

c. A is equal to NH,
d. $n$ is equal to 0, and
e. m is defined as in claim 1, and an organic solvent therefor, said organic solvent being substantially inert toward the polyimide.

7. A polyamic acid consisting essentially of the recurring unit having the formula

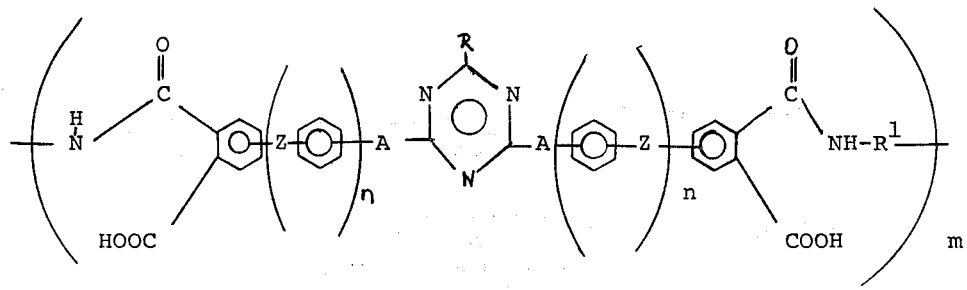

wherein R, A, Z, n, R¹ and m are as defined in claim 1.

8. A film which consists essentially of a polyimide of claim 1.

9. A prepreg consisting essentially of a substrate impregnated with a polyamic acid of claim 7.

10. A prepreg consisting essentially of a substrate impregnated with a soluble polyimide of claim 6.

11. A laminate consisting essentially of a substrate impregnated with a polyimide of claim 1.

12. A molding powder consisting essentially of a polyimide of claim 1.

* * * * *